June 4, 1940.    O. H. FOWLER    2,203,136
BRAKE TESTER
Filed Aug. 3, 1936    6 Sheets-Sheet 1

INVENTOR.
*OWEN H. FOWLER*
BY
ATTORNEY.

June 4, 1940.   O. H. FOWLER   2,203,136
BRAKE TESTER
Filed Aug. 3, 1936   6 Sheets-Sheet 2

INVENTOR.
OWEN H. FOWLER
by
ATTORNEY.

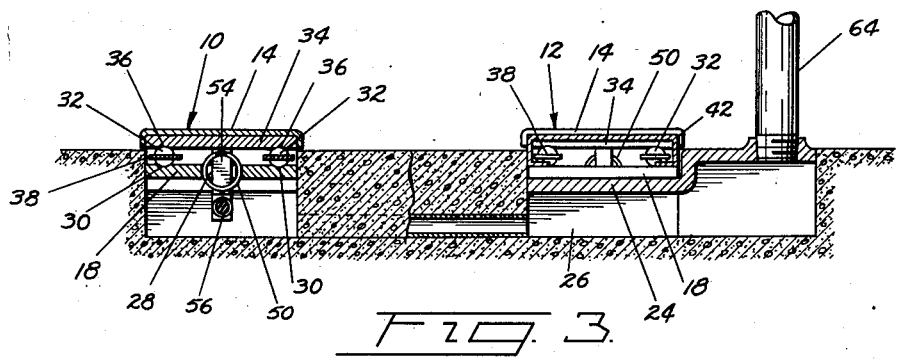
Fig. 3.
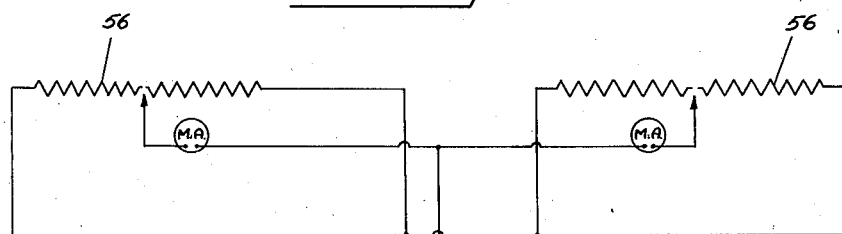
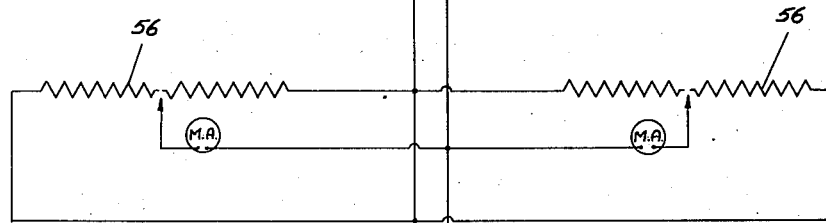
Fig. 4.
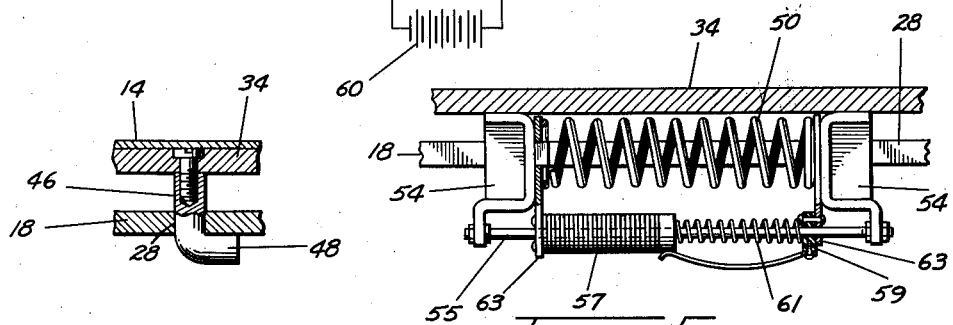
Fig. 5.   Fig. 6.
INVENTOR.
BY *OWEN H. FOWLER*
ATTORNEY.

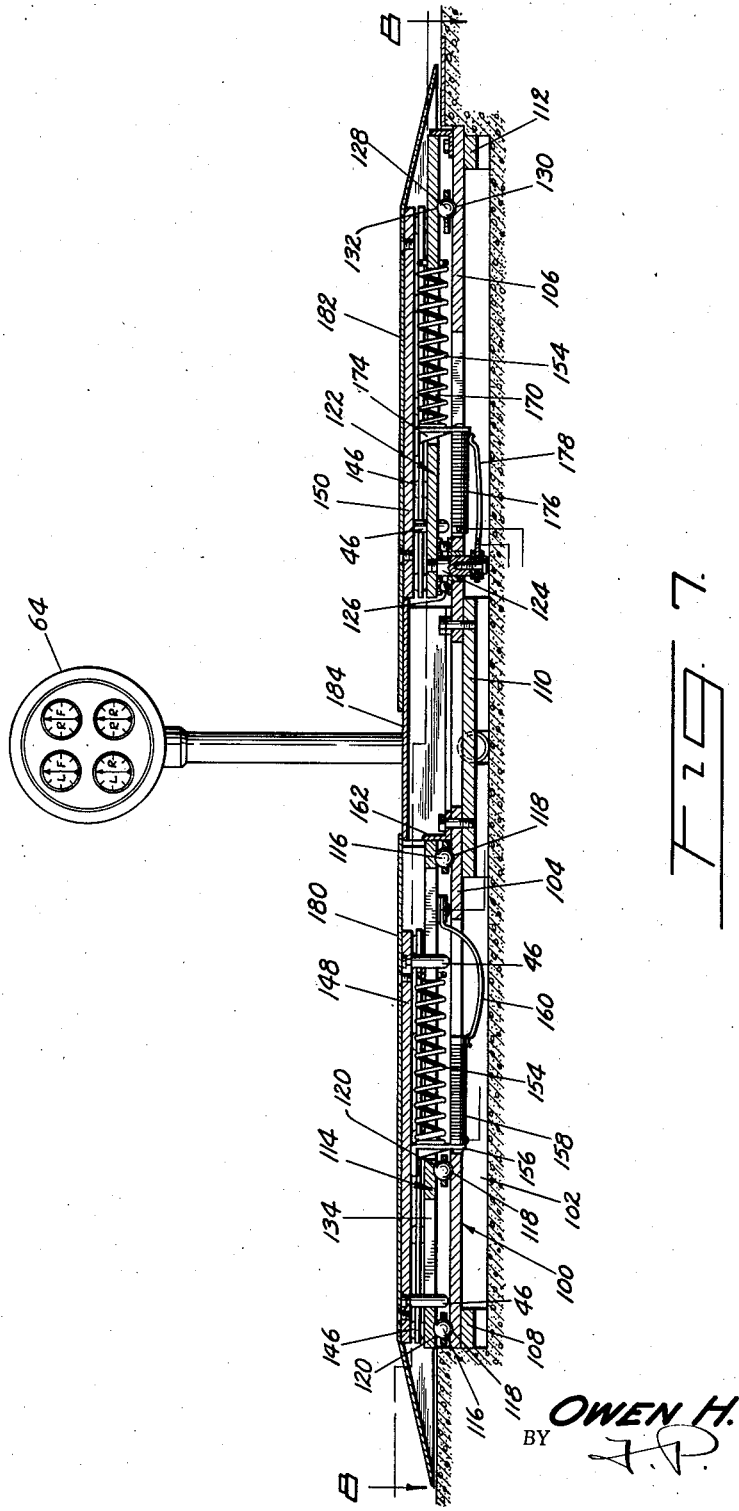

June 4, 1940.   O. H. FOWLER   2,203,136
BRAKE TESTER
Filed Aug. 3, 1936   6 Sheets-Sheet 5
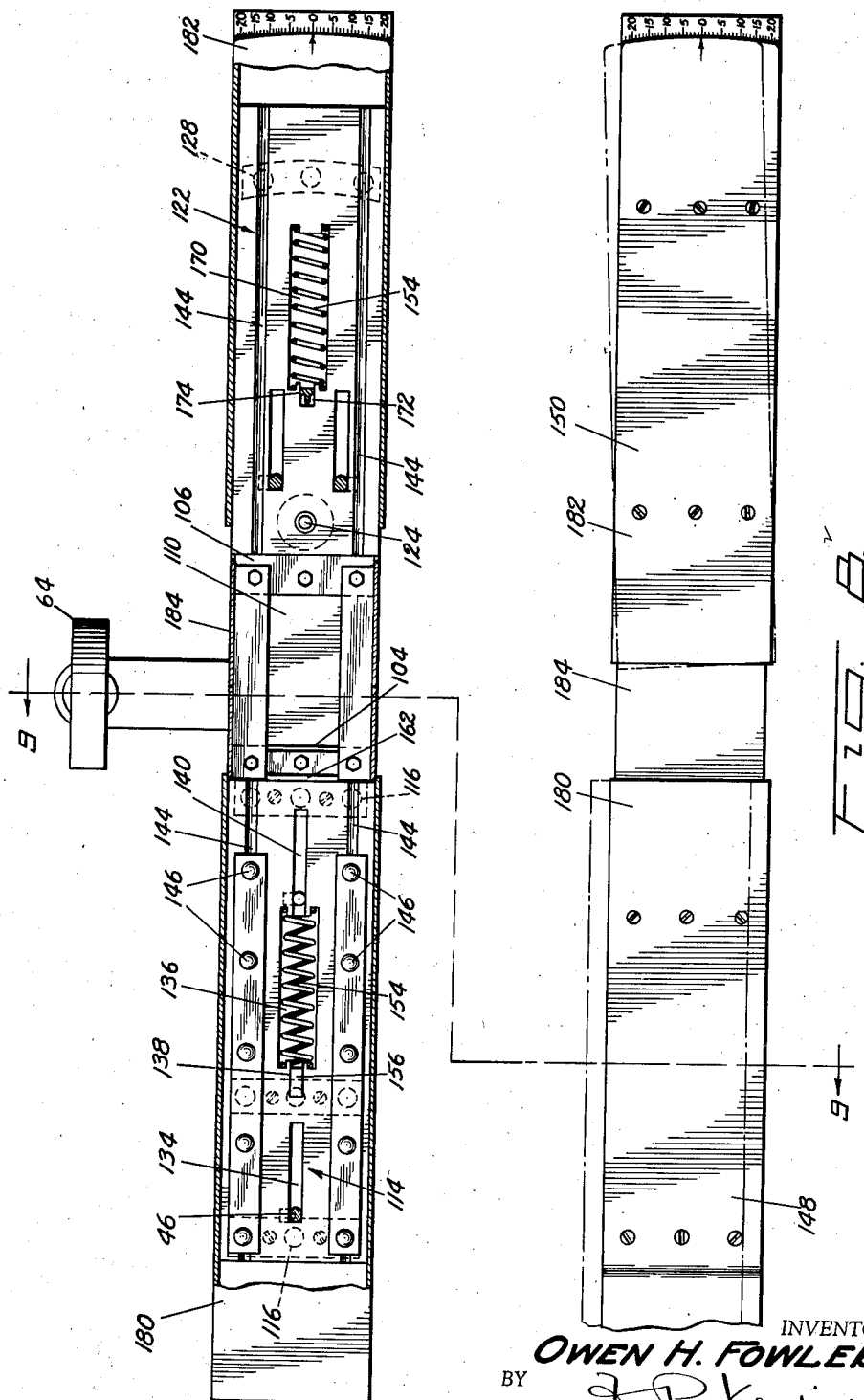
INVENTOR.
OWEN H. FOWLER
BY
ATTORNEY.

June 4, 1940.                O. H. FOWLER                2,203,136
                              BRAKE TESTER
                           Filed Aug. 3, 1936            6 Sheets-Sheet 6
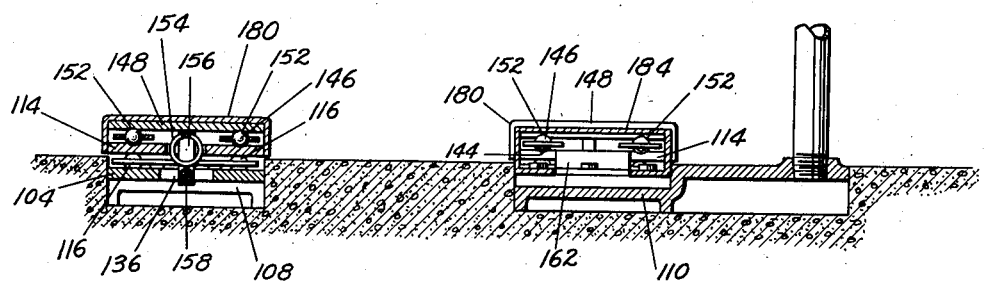
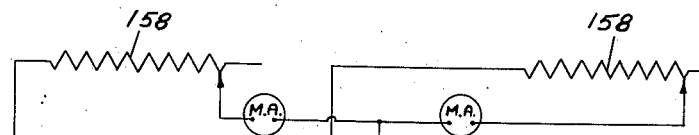
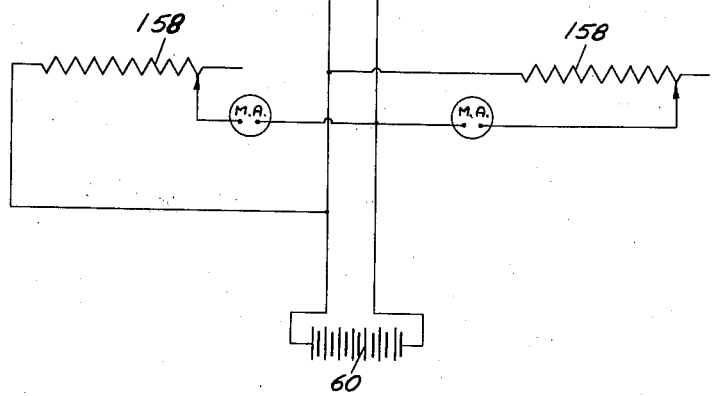
INVENTOR.
OWEN H. FOWLER
BY
                    ATTORNEY.

Patented June 4, 1940

2,203,136

UNITED STATES PATENT OFFICE 2,203,136

BRAKE TESTER

Owen H. Fowler, Detroit, Mich., assignor to Bendix Products Corporation, South Bend, Ind., a corporation of Indiana Application August 3, 1936, Serial No. 94,095

12 Claims. (Cl. 73—51)

The present invention relates to brake testers for testing the brakes of automotive vehicles, and more particularly, to a brake tester of the impact type.

In brake testers of the impact type, a platform is provided for each of the vehicle wheels or as many of the wheels as are to be tested, the platforms being mounted for movement resulting from the inertia of the vehicle transmitted to the platform through the braked wheels when the vehicle is rolled across the platforms with the brakes applied. The extent of movement of the platforms against some sort of resistance such as springs, or the force tending to move the platforms is measured while the vehicle traverses the same with its brakes applied, and thus an indication of brake efficiency or effectiveness of the individual wheels is obtained.

In brake testers of the above type, provision has usually been made for operation when a vehicle is driven in one direction only across the platforms so that in order to make a test a vehicle must always be driven on the platforms from the same direction. This has probably resulted from the fact that such a construction is more simple, and also that uniform operation in opposite directions would be difficult to obtain.

Accordingly it is an object of this invention to provide a brake tester of the type described capable of rendering measurements for both directions of travel.

Another object of the invention is to provide a brake tester which may be operated in both directions and in which the measurements for both directions are derived from a common means.

A further object of the invention is to provide a brake tester capable of operating in either direction of extremely simple, yet rugged, construction.

Yet another object of the invention is to provide in a brake tester of the type described a single device for opposing or resisting the force to be measured regardless of application direction.

Still another object of the invention is to provide a brake tester of the impact type with a rugged simple construction and having wheel treads capable of mounting for lateral and swivel movements.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference numerals indicate like parts:

Fig. 3 is a transverse section taken through the tester as indicated in Fig. 2 by the line 3—3 on which the section is taken;

Fig. 4 illustrates the electric circuit used in connection with the brake tester;

Fig. 5 is a section taken through Fig. 2 on the line 5—5 showing a hold-down hook;

Fig. 6 shows an alternative construction for producing electric indications;

Fig. 7 is a longitudinal section taken through one of the runways of a slightly modified form of brake tester substantially on the center line;

Fig. 8 is a top plan view of the brake tester showing the platforms and one runway removed, the parts removed being above the section line 8—8 of Fig. 7;

Fig. 9 is a transverse section taken through the tester as indicated in Fig. 8 by the line 9—9;

Fig. 10 illustrates an electric circuit particularly adapted to be used in connection with the modification of Fig. 7;

Figure 1:
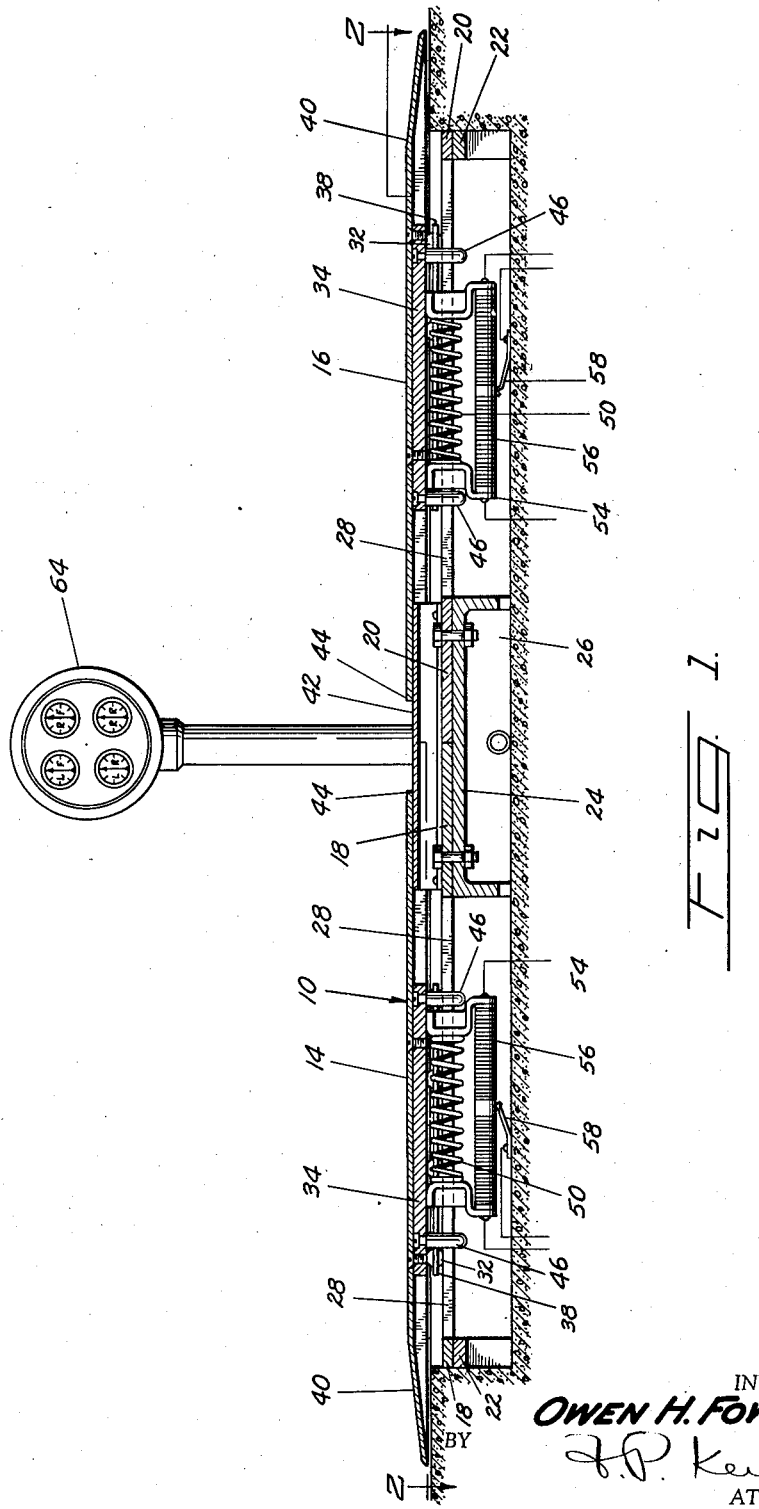
Fig. 1 is a longitudinal section taken through one of the runways of one form of the brake tester substantially on the center line.
Figure 2:
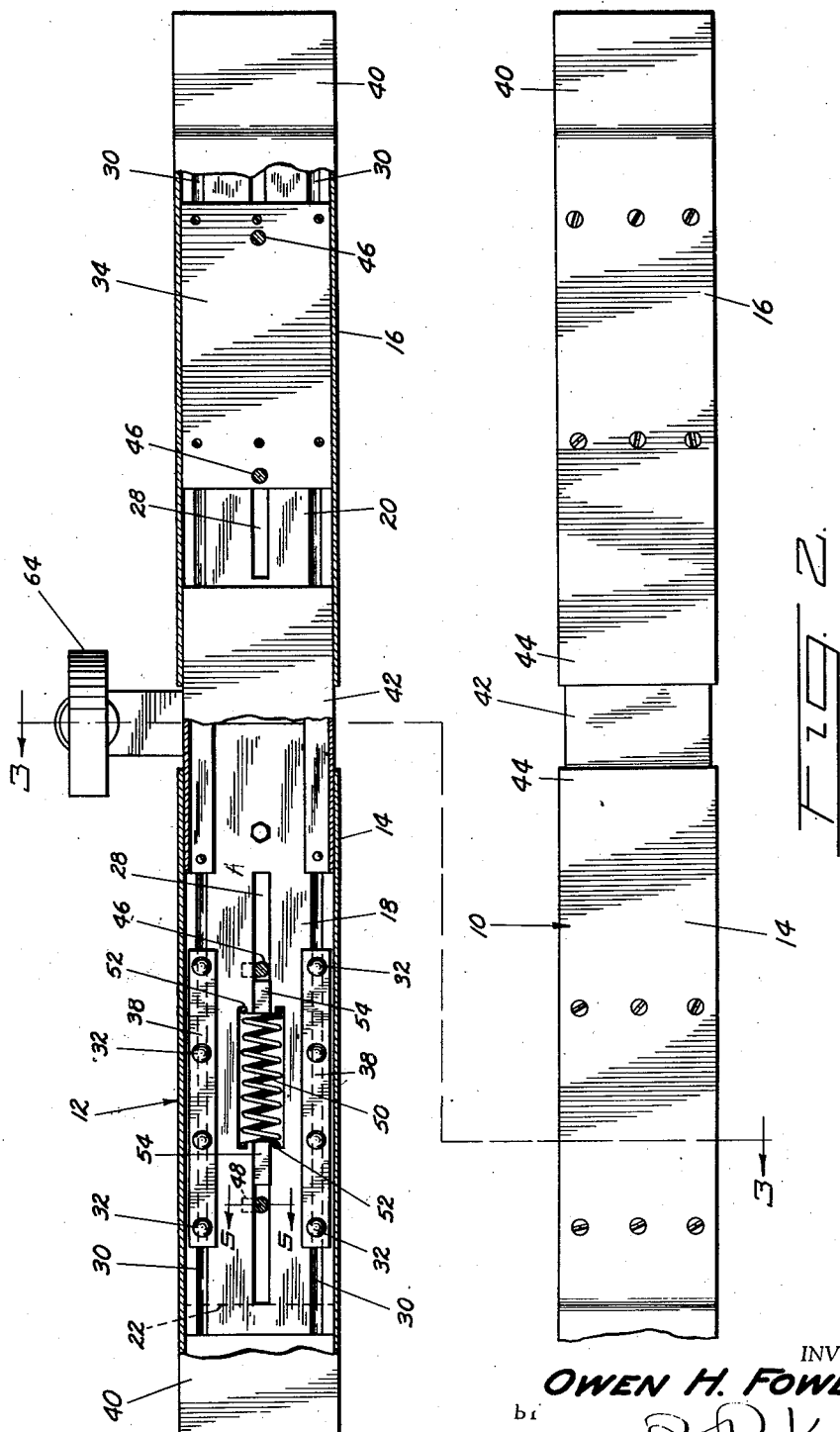
Fig. 2 is a top plan view of the brake tester showing one platform removed and one tread plate removed, the parts removed being above the section line 2—2 of Fig. 1.

Referring more particularly to Figs. 1 and 2, there is shown a pair of runways 10 and 12 each having at either end a wheel tread plate 14 and 16. For supporting the tread plates for longitudinal movement, a framework is provided which is preferably sunk in a shallow pit in the floor of a garage or other suitable location. As shown, the frame comprises a pair of members 18 and 20 at either end of the device, each of which is supported upon channel members 22 at either end and 24 in the middle. The frame members 18 and 20 at their adjacent ends abut one another and their remote ends abut the end walls of the shallow pit 26.

Each of the main frame members 18 and 20 are provided with a central slot 28, to be hereinafter described more in detail, and parallel grooves 30 adjacent either edge and the top side thereof, the parallel grooves being adapted to receive a series of rolling balls 32. Mounted for longitudinal movement with respect to the frame members are platforms 34, each of which has on the underside thereof parallel grooves 36 corresponding to the parallel grooves 30 in the main support member. The balls 32 which are retained in proper spaced position by plates 38 support the platforms in anti-friction longitudinal rolling relation to the main support members. Each of the platforms carry on the top thereof the hereinbefore mentioned tread plates 14 and 16 which are suitably secured thereto by any common fastening means. The tread plates are adapted to bridge the shallow pit, the same being provided with a slight ramp 40 at their remote ends and cooperating with a short stationary tread 42 over which the adjacent ends 44 of the treads are adapted to slide.

The support plates 18 and 20, as previously described, have a central slot 28 therein of sufficient width at either end to receive a short stud 46 depending from the platforms through the slots. These studs are provided with a right angle bend 48 just below the support plate which, when turned transversely to the runways, holds the movable carriage from jumping away from the main support plate.

The slot 28 is enlarged at its central portion, sufficiently to receive a spring 50 which is spaced between the shoulders 52 formed by the enlarged slot width and between depending brackets 54 which are secured to the underside of the platforms 34. The brackets 54 are sufficiently narrow to slide in the narrow part of the slot 28 and carry at their lower ends an indicating device which, as shown, consists of a double-ended resister unit 56. A slider 58 adapted to make sliding contact with the resister is fixed to the bottom of the pit 26. The slider is so arranged in connection with the resister that when the platforms are in their central position, the slider makes contact with a central portion on the resister which may or may not be insulated. Movement of the platform in either direction, however, causes the slider to make contact with the resister at varying points functioning like a rheostat so that by means of a suitable indicator connected in circuit with the resistor and slider an indication of the extent of movement of the platform may be obtained.

A circuit for accomplishing this result is illustrated in Fig. 4 wherein the battery 60 is shown, one side of which is connected to the opposite ends of the various resisters 56 and the other side of which is connected through 4 milliammeters, each milliammeter being in turn connected to a slider. The milliammeters may be conveniently arranged, as shown in Fig. 1, on a support 64 so that all indications as to the relative movement of the various platforms may be observed simultaneously.

In Fig. 6 a slightly modified form of the invention is illustrated wherein a single resister rather than a double resister is employed. As therein shown, the depending brackets 54 carry a support rod 55 on which is slidably threaded both a resister 57 and a slider support sleeve 59. The resister and slider support sleeve are carried on spaced plates 63 and urged apart by a light spring 61. The plates 63 are located at either end of the spring 50 and are likewise slidably threaded on the support rod 55. Thus, any contraction of the spring 50 due to either arm 54 moving towards the shoulders 52 at the opposite end of the slot causes plates 63 to approach each other with such contraction and correspondingly causes movement of the slider relative to the resister and the necessity for a double resister is done away with.

In operation a vehicle may be driven on the runways and the brakes applied as the wheels traverse the treads. The inertia of the vehicle will then, through the braked wheels, cause the treads to move compressing the springs 50 and producing a change in the position of the contact on the electric resistance 56, thereby producing an indication as to the extent of movement of the tread. Since the force which can be transmitted from the moving vehicle to the wheel tread depends upon the extent to which the individual wheel brake is effective, the indicator will indicate accurately the condition of the vehicle brakes. One of the features of the invention resides in the fact that the tester may be used by a vehicle traversing the same in either direction. This results from the fact that the spring 50 may be compressed by movement of the platform in either direction. For example, if the platforms are moved to the left the spring is compressed between the right hand bracket 54 and the left hand shoulders in the slot 28. If the vehicle is moved in the opposite direction, that is to the right, the spring is compressed between the left hand bracket 54 and the shoulder at the right hand end of the slot. Thus the same spring can be used for tests in either direction and under the same circumstances so that the accuracy of the machine cannot vary because of the direction in which it is used. In the modification of Fig. 6 the foregoing statement is especially true since the same resister is employed for movement in either direction and must necessarily give the same indication for the same spring compression regardless of the direction of the compressing force. While it is true that the structure of Fig. 1 with a double resister may be made just as accurate, it is necessary that the resisters be symmetrical in their electrical characteristics.

Referring to Figs. 7 through 10, there is illustrated a modified form of brake tester, the mechanical structural details of Figs. 1 and 2 being employed to a large extent. As shown particularly in Figs. 7 and 8, the brake tester is made up of a frame 100 set in a shallow pit indicated by 102, the frame being made up of a pair of flat members 104 and 106 supported upon short channels 108, 110 and 112. Each of the frame members 104 and 106 is adapted to support a carriage, the frame member 104 being provided with a carriage 114 which is transversely movable by reason of its support on anti-friction balls 116 which roll in shallow transverse grooves 118 and 120 in the frame member 104 and the carriage member 114. The frame member 106 is provided with a carriage member 122 which is swivelled at one end on a pivot 124, a ball thrust bearing 126 being provided around the pin and the forward end of the carriage being supported upon anti-friction balls 128 rolling in shallow arcuate grooves 130 and 132 in the frame member and carriage member respectively.

As in the structure of Figs. 1 and 2, the carriage members 114 and 122 are provided with central slots for the reception of anchoring means, guides and measuring springs. The carriage 114 is provided with a narrow slot 134 at one end and a wider slot 136 in the central portion having narrow slots 138 and 140 extending in opposite directions from the wide slot 136. Along either side of the carriage members 114 and 122 are shallow grooves 144 adapted to receive anti-friction balls 146 and on which roll platforms 148 and 150, the platforms being provided on their underside with corresponding grooves 152 for the reception of the anti-friction balls.

In order to yieldingly resist movement of the platforms, a spring 154 is positioned in the wide slot 136 and is adapted to seat against the shoulders formed at either end of the wide slot. An arm 156 secured to the underside of the platform 148 extends downward through the narrow slot 138 and is adapted to engage the end of the spring 154. The arm also carries a resister 158 which is adapted to cooperate with a sliding contact 160 secured on the carriage 114 preferably in an insulated fashion. The main frame may be provided with an anchor bracket 162 against which the carriage 114 may abut when a force is transmitted to the platform 148. In order to retain the platform 148 in proper position, holddown pins 46 such as shown in Fig. 5 are provided in association with the slots 134 and 140.

The carriage 122 differs slightly from the carriage 114 because of its swivel movement. As previously described, the spring 154 is set in the wide slot 170 which has a narrow end portion 172. An arm 174 secured to the underside of the platform 150 extends through the narrow slot 172 and is adapted to engage a spring 154. The arm also carries a resister 176 which cooperates with a contact slider 178 the latter being supported in an insulated manner from the swivel pin 124 so that as the carriage is swivelled the resister and contact have a corresponding movement. Each of the platforms 148 and 150 is provided with treads 180 and 182 which have ramps and cooperate with a center stationary tread 184 similar to the modification of Figs. 1 and 2.

The electric circuit shown in Fig. 10 is, in effect, half of the circuit shown in Fig. 4 and operates in the same manner.

It will appear from the foregoing description that the brake tester in Figs. 7 through 10 is capable of use in the same manner as the modification of Figs. 1 to 6 except that the structure has not been adapted for operation in both directions. In the event of any misalignment of the rear wheels or the forward wheels, one of the platforms is adapted to move to compensate for the misalignment so that there will be no side thrust upon the wheels during the test. Also during the test for brake efficiency the relative lateral movement of the rear platforms 148 as the wheels roll across or the relative swinging movement of the forward platforms 150 as the wheels roll across would indicate simultaneously the misalignment of the wheels. Also by swinging the forward platforms to one side or the other and turning the steering wheels of the vehicle as the car is driven across the platform to correspond with the forward platforms, a test may be made which will indicate the operation of the brakes while the vehicle is rounding a turn. Also under these conditions, the alignment of the forward wheels when steered away from straight ahead can be observed. Also should it not be practical to guide the vehicle during an impact test along the brake tester with the forward platforms turned, it will appear obvious that tests can be effected by pushing or pulling the vehicle over the testing platforms by some outside force, for example, another vehicle.

There is thus provided a novel impact brake tester capable of use by vehicles traversing the same in either direction, the structure thereof being extremely simple, and the measurements being taken as a result of the deflection or relative movement of the same parts regardless of the direction of movement of the vehicle.

Though several embodiments of the invention have been illustrated and described, together with a slight modification of one of them, it is to be understood that the invention is not limited thereto but may be embodied in various other mechanical arrangements and forms. As various changes in construction and arrangement may be made without departing from the spirit of the invention as will be apparent to those skilled in the art, reference will be had to the appended claims for a definition of the limits of the invention.

What is claimed is:

1. An impact automotive vehicle brake tester comprising a supporting frame, a longitudinally movable platform thereon, there being a slot in said frame having a centrally enlarged portion, a yielding element in said enlarged portion, and arms depending from said platform at either end of said yielding element.

2. An impact automotive vehicle brake tester comprising a supporting frame, a longitudinally movable platform thereon, there being a slot in said frame having a centrally enlarged portion, a yielding element in said enlarged portion, arms depending from said platform at either end of said yielding element, and means for indicating the extent of movement of said platform.

3. An impact automotive vehicle brake tester comprising a supporting frame, a platform thereon longitudinally movable in either direction from a central normal position, anti-friction means for supporting said platform, there being a central longitudinally-extending slot in said frame having a central portion thereof of increased width, a spring positioned in said central portion, and adapted at either end to bear against the slot shoulders formed by the increased width, arms depending from said platform into the narrow portions of said slot adapted to engage the spring ends, and means cooperating with the slot to restrain the platform from movements other than longitudinal.

4. An impact automotive vehicle brake tester comprising a supporting frame, a platform thereon longitudinally movable in either direction from a central normal position, anti-friction means for supporting said platform, there being a central longitudinally-extending slot in said frame having a central portion thereof of increased width, a spring positioned in said central portion, and adapted at either end to bear against the slot shoulders formed by the increased width, arms depending from said platform into the narrow portions of said slot and adapted to engage the spring ends, and means for indicating the extent of movement of the platforms in both directions.

5. An impact automotive vehicle brake tester comprising a supporting frame, a platform thereon longitudinally movable in either direction from a central normal position, anti-friction means for supporting said platform, there being a central longitudinally-extending slot in said frame having a central portion thereof of increased width, a spring positioned in said central portion, and adapted at either end to bear against the slot shoulders formed by the increased width, arms depending from said platform into the narrow portions of said slot adapted to engage the spring ends, means cooperating with the slot to restrain the platform from movements other than longitudinal, and an electrical indicating means comprising a resistance unit supported from said arms, a stationary slider for slidably contacting said unit, and electrical circuit means including a source of electrical energy and an electrical current indicating instrument.

6. An impact automotive vehicle brake tester comprising a supporting frame, a platform thereon longitudinally movable in either direction from a central normal position, anti-friction means for supporting said platform, there being a central longitudinal-extending slot in said frame having a central portion thereof of increased width, a spring positioned in said central portion, and adapted at either end to bear against the slot shoulders formed by the increased width, arms depending from said platform into the narrow portions of said slot adapted to engage the spring ends, means cooperating with the slot to restrain the platform from movements other than longitudinal, and an electrical indicating means comprising a double resistance unit supported between said arms and a stationary slider contact adapted to slide from a midpoint on said unit towards either end upon movement of said platform in either direction.

7. An impact automotive vehicle brake tester comprising a supporting frame, longitudinally movable wheel platforms thereon movable from a central normal position, a spring nested in a rectangular aperture in said frame member beneath each of said platforms, there being a longitudinally-extending narrow slot in the frame member extending in each direction from the aperture, a pair of arms depending from the platform through the slots at opposite ends of the spring, an indicating unit for determining deflection of said spring, and means for supporting the indicating unit from the arms.

8. In an impact brake tester for automotive vehicles, a supporting member, a platform adapted for movement longitudinally with respect to the member, an anchor for the member adapted to resist longitudinal movement thereof, a slot in said member having narrow portions and a central wide portion, a spring in said wide portion, an arm secured to said platform and extending through one of the narrow portions of said slot and adapted to engage one end of said spring, and means secured to said platform and depending through the other narrow portion of said slot for restricting the platform to longitudinal movement with respect to the slot.

9. In an impact brake tester for automotive vehicles, a supporting member, a platform adapted for movement longitudinally with respect to the member, an anchor for the member adapted to resist longitudinal movement thereof, a slot in said member having narrow portions and a central wide portion, and shoulders at the juncture of the narrow and wide portions, a spring nested in the wide portion and resting against said shoulders at either end, an arm secured to said platform and extending through one of the narrow portions of said slot and adapted to engage one end of said spring, and means including a pin secured to said platform and depending through the other narrow portion of said slot for restricting the platform to longitudinal movement with respect to the slot.

10. An impact automotive vehicle brake tester comprising a supporting frame, a platform thereon longitudinally movable with respect to said frame, anti-friction means for supporting said platform, there being a central longitudinally extending slot in said frame having a central portion thereof of increased width, a spring positioned in said central portion, and adapted at either end to bear against the slot shoulders formed by the increased width, an arm depending from said platform into a narrow portion of said slot to engage an end of the spring, means cooperating with the slot to restrain the platform from movements other than longitudinal, and an electrical indicating means comprising a resistance supported at one end by said arm, and a relatively stationary electrical slider contact adapted to slide on said resister upon longitudinal movement of the platform.

11. An impact automotive vehicle brake tester comprising a supporting frame, a longitudinally movable platform thereon, there being a longitudinally extending slot in said frame having a centrally enlarged portion, a yielding element in said enlarged portion and engaging the end shoulders formed by the enlarged portion, an arm depending from the platform through a narrow portion of said slot and adapted to engage an end of said element, and means extending through said slot along a narrow portion thereof to restrict said platform to longitudinal movement only.

12. An impact automotive vehicle brake tester comprising a supporting frame, a movable wheel platform, a single spring mounted in said frame, there being a longitudinally-extending slot in said frame and located in substantial alignment with said spring, the slot extending in opposite directions from both ends of said spring, and means rigidly connected to said platform and cooperating with said slot, said means abutting opposite ends of said spring for yieldably resisting longitudinal movement of said platform in opposite directions from a central normal position and restraining said platform from movement other than longitudinal.

OWEN H. FOWLER.